United States Patent [19]

Broadway

[11] Patent Number: 4,672,251

[45] Date of Patent: Jun. 9, 1987

[54] POLE CHANGEABLE, THREE PHASE WINDINGS

[75] Inventor: Alexander R. W. Broadway, Bristol, England

[73] Assignee: National Research Development Corporation, London, England

[21] Appl. No.: 853,159

[22] Filed: Apr. 17, 1986

[30] Foreign Application Priority Data

Apr. 23, 1985 [GB] United Kingdom ................. 8510351

[51] Int. Cl.$^4$ ............................................. H02K 3/00
[52] U.S. Cl. ................................. 310/198; 310/184; 318/773
[58] Field of Search ............................... 310/198–208, 310/180, 184, 71; 318/773

[56] References Cited

U.S. PATENT DOCUMENTS

| | | | |
|---|---|---|---|
| 3,794,870 | 2/1974 | Broadway et al. ................. | 310/180 |
| 4,127,787 | 11/1978 | Auinger .............................. | 310/184 |
| 4,163,915 | 8/1979 | Fong ................................... | 310/198 |
| 4,338,534 | 7/1982 | Broadway et al. .................. | 310/184 |

FOREIGN PATENT DOCUMENTS

| | | | |
|---|---|---|---|
| 1341437 | 12/1973 | United Kingdom . | |
| 1484193 | 9/1977 | United Kingdom ................. | 310/198 |
| 1534341 | 12/1978 | United Kingdom . | |
| 1587315 | 4/1981 | United Kingdom . | |

*Primary Examiner*—R. Skudy
*Attorney, Agent, or Firm*—Larson and Taylor

[57] ABSTRACT

A 3-phase, pole-changeable, phase-modulated winding providing alternative pole-number working by 6-terminal changeover switching. The winding provides 3-parallel, 3-phase, star-connected winding branches for both the alternative pole-number connections. In a preferred arrangement all the winding parts are energized for both the alternative pole-number connections.

6 Claims, 20 Drawing Figures

| 1 | 2 | 3 | 4 | 5 | 6 | 7 | 8 | 9 | 10 | 11 | 12 | Slot Numbers |
|---|---|---|---|---|---|---|---|---|---|---|---|---|
| 0 | $\pi/3$ | $2\pi/3$ | $\pi$ | $4\pi/3$ | $5\pi/3$ | $2\pi$ | $7\pi/3$ | $8\pi/3$ | $3\pi$ | $10\pi/3$ | $11\pi/3$ | (a) |
| 0 | $\pi/6$ | $\pi/3$ | $\pi/2$ | $2\pi/3$ | $5\pi/6$ | $\pi$ | $7\pi/6$ | $4\pi/3$ | $3\pi/2$ | $5\pi/3$ | $11\pi/6$ | (b) |
| 0 | $\pi/2$ | $\pi$ | $3\pi/2$ | $2\pi$ | $5\pi/2$ | $3\pi$ | $7\pi/2$ | $4\pi$ | $9\pi/2$ | $5\pi$ | $11\pi/2$ | (c) |
| 0 | $\pi/3$ | $2\pi/3$ | $\pi$ | $4\pi/3$ | $5\pi/3$ | 0 | $\pi/3$ | $2\pi/3$ | $\pi$ | $4\pi/3$ | $5\pi/3$ | (d) |
| 0 | $\pi/2$ | $\pi$ | $3\pi/2$ | 0 | $\pi/2$ | $\pi$ | $3\pi/2$ | 0 | $\pi/2$ | $\pi$ | $3\pi/2$ | (e) |
| A | −C | B | −A | C | −B | A | −C | B | −A | C | −B | (f) |
| D | −G | F | −E | D | −G | F | −E | D | −G | F | −E | (g) |

| Slot Numbers | 1 | 2 | 3 | 4 | 5 | 6 | 7 | 8 | 9 | 10 | 11 | 12 | |
|---|---|---|---|---|---|---|---|---|---|---|---|---|---|
| | 0 | $\pi/3$ | $2\pi/3$ | $\pi$ | $4\pi/3$ | $5\pi/3$ | $2\pi$ | $7\pi/3$ | $8\pi/3$ | $3\pi$ | $10\pi/3$ | $11\pi/3$ | (a) |
| | 0 | $\pi/6$ | $\pi/3$ | $\pi/2$ | $2\pi/3$ | $5\pi/6$ | $\pi$ | $7\pi/6$ | $4\pi/3$ | $3\pi/2$ | $5\pi/3$ | $11\pi/6$ | (b) |
| | 0 | $\pi/2$ | $\pi$ | $3\pi/2$ | $2\pi$ | $5\pi/2$ | $3\pi$ | $7\pi/2$ | $4\pi$ | $9\pi/2$ | $5\pi$ | $11\pi/2$ | (c) |
| | 0 | $\pi/3$ | $2\pi/3$ | $\pi$ | $4\pi/3$ | $5\pi/3$ | 0 | $\pi/3$ | $2\pi/3$ | $\pi$ | $4\pi/3$ | $5\pi/3$ | (d) |
| | 0 | $\pi/2$ | $\pi$ | $3\pi/2$ | 0 | $\pi/2$ | $\pi$ | $3\pi/2$ | 0 | $\pi/2$ | $\pi$ | $3\pi/2$ | (e) |
| | A | −C | B | −A | C | −B | A | −C | B | −A | C | −B | (f) |
| | D | −G | F | −E | D | −G | F | −E | D | −G | F | −E | (g) |

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | Slot Numbers |
|---|---|---|---|---|---|---|---|---|---|---|---|---|---|---|---|---|---|---|---|---|---|---|---|---|
| A | -C | B | -A | C | -B | A | -C | B | -A | C | -B | A | -C | B | -A | C | -B | A | -C | B | -A | C | -B | (a) |
| 1 | 1 | 1 | 1 | 1 | 1 | 1 | 1 | $a^2$ | $a^2$ | $a^2$ | $a^2$ | $a^2$ | $a^2$ | $a^2$ | $a^2$ | a | a | a | a | a | a | a | a | (b) |
| A | -C | B | -A | C | -B | Ⓐ | -Ⓒ | C | -B | A | -C | B | -A | Ⓒ | -Ⓑ | B | -A | C | -B | A | -C | Ⓑ | -Ⓐ | (c) |

```
 1  2  3  4  5  6  7  8  9 10 11 12 13 14 15 16 17 18 19 20 21 22 23 24  Slot Numbers
 A -C  B -A  C -B  A -C  B -A  C -B  A -C  B -A  C -B  A -C  B -A  C -B     (a)
 1  1  1  1  1  1  0  0  a² a² a² a² a² a²  0  0  a  a  a  a  a  a  0  0   (b)
 A -C  B -A  C -B Ⓐ Ⓒ  C -B  A -C  B -A Ⓒ Ⓑ  B -A  C -B  A -C Ⓑ Ⓐ         (c)
```

```
 1  2  3  4  5  6  7  8  9 10 11 12 13 14 15 16 17 18    Slot Numbers

POLE CHANGEABLE, THREE PHASE WINDINGS

BACKGROUND OF THE INVENTION

This invention relates to pole-changeable, three-phase windings of the phase-modulated type.

There are three ways in which a continuous sinusoidal wave, or carrier wave, can be modulated: amplitude modulation, phase modulation and frequency modulation. These three modulation modes are familiar in telecommunications practice, but the theory applies also to rotary electrical machines, where the continuous wave concerned is the travelling wave of ampere-conductors, or current sheet, or magnetomotive force, around a polyphase winding.

Frequency modulation provides speed-changing through variation of the supply frequency. Amplitude modulation and phase modulation are applied to the space distribution of a polyphase winding to bring about speed change by pole-number changing.

Pole-amplitude modulation (P.A.M.), invented by Professor Rawcliffe and others, effects modulation of pole-amplitudes in a phase-winding by reversal of direction of current flow in one half phase-winding with respect to the other half. The method can thus be implemented, in a three-phase winding, using only six winding terminals and a simple changeover switch.

Phase modulation is the oldest known method because early proposals for speed-changing motors, requiring the switching of winding parts into different supply phases for different speeds, are in fact phase modulating methods. These proposals found little practical use, however, because they necessitated a large number of winding terminals and complicated switching.

Recently, that is to say a little more than a decade ago, there have been proposed a class of phase-modulated, pole-changeable motors capable of being implemented with six-terminal, changeover switching. An example is described in British Patent specification No. 1,484,193. The method there disclosed requires a three-phase winding with some coils which are connected in circuit for one of the alternative pole-numbers and omitted for the other. More generally, the method may require a number of such coils, some of which number are used only for one pole-number and others of which number are used only for the other pole-number. Winding arrangements are disclosed in the above-quoted patent specification enabling these methods to be implemented with six-terminal, changeover switching.

Given an alternating current supply of fixed frequency, as is the common practical case, speed-changing involves pole-number changing and this necessitates a choice between the pole-amplitude modulation and the phase-modulation methods.

SUMMARY OF THE PRESENT INVENTION

The present invention concerns windings using phase-modulation, but is restricted to the use of six-terminal, changeover switching.

The object of the invention is to provide such windings using a systematic method of phase-modulation, providing multiple-branch per phase self-paralleling connections and, in the particular conditions described, providing pole-changing switching which enables all winding coils to be connected in circuit at both of the alternative pole-numbers.

Although the theory underlying the invention extends to polyphase windings, the examples described herein are three-phase windings, these being the examples finding greatest use in practice.

Within this three-phase context, the modulation method is herein described as "three-step phase-modulation" and the winding connections are herein described as "three-branch per phase self-paralleling".

Accordingly, the invention provides a 3-phase, pole-changeable, phase-modulated winding switchable to provide an unmodulated pole-number and a modulated pole-number by alternative connection of a 3-phase supply to a first set of three supply terminals and to a second set of three supply terminals, said 3-phase winding providing a 3-parallel, 3-phase, star-connected arrangement of winding branches with both said alternative supply connections, said 3-phase winding comprising three identical component windings each component winding providing winding parts in each of said 3-parallel, star-connected branches, said three component windings being physically spaced apart within said 3-phase winding such that electrical displacement therebetween at said unmodulated pole-number is substantially 120 degrees and the electrical displacement at said modulated pole-number is substantially zero and said winding parts of said component windings being distributed between the phases of said 3-phase winding such that said alternative supply connections provide 3-step phase-modulation, as herein defined, of said 3-phase winding.

A particularly advantageous form of the invention provides a 3-phase pole-changeable, phase-modulated winding switchable to provide an unmodulated pole-number and a modulated pole-number by alternative connection of a 3-phase supply to a first set of three supply terminals and to a second set of three supply terminals, said 3-phase winding providing a 3-parallel, 3-phase, star-connected arrangement of winding branches with both said alternative supply connections together with winding branches serially-connected to at least one set of said first and second sets of three supply terminals, said 3-phase winding comprising three identical component windings, each component winding providing winding parts in each of said 3-parallel, star-connected branches and in each of said serially-connected branches, said three component windings being physically spaced apart within said 3-phase winding such that the electrical displacement therebetween at said unmodulated pole-number is substantially 120 degrees and the electrical displacement at said modulated pole-number is substantially zero and said winding parts of said component windings being distributed between the phases of said 3-phase winding such that said alternative supply connections provide 3-step phase-modulation, as herein defined, of said 3-phase winding.

A preferred form of the invention provides a 3-phase, pole-changeable, phase-modulated winding switchable to provide an unmodulated pole-number and a modulated pole-number by alternative connection of a 3-phase supply to a first set of three supply terminals and to a second set of three supply terminals, said 3-phase winding providing solely a 3-parallel, 3-phase, star-connected arrangement of winding branches with both said alternative supply connections, said 3-phase winding comprising three identical component windings each component winding providing winding parts in each of said 3-parallel, star-connected branches, said three component windings being physically spaced apart within said 3-phase winding such that electrical displacement therebetween at said unmodulated pole-number is substantially 120 degrees and the electrical displacement at said modulated pole-number is substantially zero and said winding parts of said component windings being distributed between the phases of said 3-phase winding such that said alternative supply connections provide 3-step phase-modulation, as herein defined, of said 3-phase winding.

BRIEF DESCRIPTION OF THE DRAWINGS

In order that the present invention may be clearly understood in relation to the prior art, certain known principles of phase-modulation and of phase-winding connection will be described with reference to the accompanying drawings and in order that the present invention may readily be carried into practice, embodiments thereof will be described in detail, by way of example, with reference to the accompanying drawings, in which:

FIG. 19 is a slot winding diagram of the resultant 6-pole/4-pole winding in 54 slots formed by the combination of the component windings of FIGS. 16 and 18.

THE THEORY OF PHASE MODULATION

Figure 1:
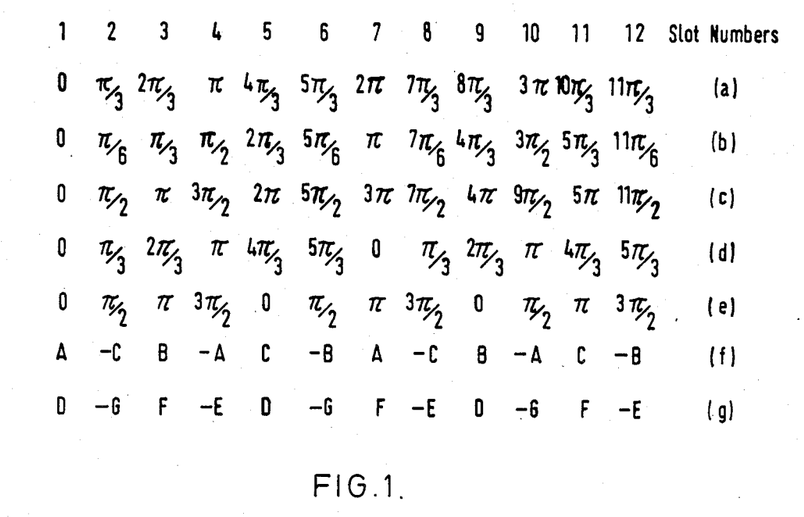
FIG. 1 is a table relating to a 4-pole winding wound in 12 slots which is linearly phase-modulated to 6-pole operation.

FIG. 1 is a table showing phase-distributions for a 4-pole/6-pole winding in 12 slots. In a distributed winding, the phase-displacement of the currents fed to successive coil sides determines its pole-number, p-poles. The total phase displacement around the winding is $p\pi$ electrical radians.

FIG. 1, Row (a), shows the initial 4-pole phase distribution. The total phase displacement is $4\pi$ electrical radians, so that the displacement between consecutive slots is $4\pi/12$ electrical radians.

By adding, or subtracting, a further electrical displacement incrementally proportional to the physical angular displacement of the coil sides, a changed pole-number is produced. Row (b) represents the slot-to-slot phase displacement corresponding to $2\pi$ electrical radians overall. Row (c) shows the sum of the displacements of Row (a) and Row (b), that is the resultant 6-pole phase distribution.

Any phase angle $\theta$ is equivalent to the phase angle $\theta \mp 2k\pi$, where k is any positive integer. Hence, the phase displacements of Row (d) are the equivalents of the phase displacements of Row (a) and those of Row (e) are the equivalents of Row (c).

Figure 2:
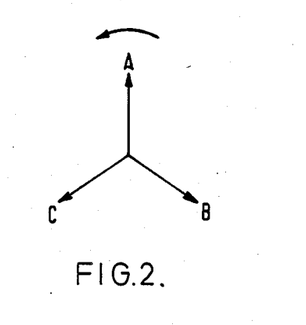
FIG. 2 is a diagram showing the rotating vectors of a 3-phase supply.
Figure 3:
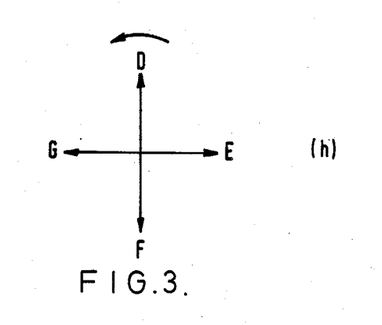
FIG. 3 is a diagram showing the rotating vectors of a 4-phase supply.

FIG. 2 shows the rotating vectors A, B, C, of a 3-phase supply. FIG. 3 shows the rotating vectors D, E, F, G, of a 4-phase supply.

Although the present invention is concerned with windings fed from a 3-phase supply, it is of interest to note that the phase-distributions of FIG. 1, Row (c) and Row (e) can be provided from a 4-phase supply. FIG. 1, Row (f) shows the 3-phase supply phase distribution; Row (g) shows the 4-phase supply distribution. In each case, the negative sign represents the reversed sense of current flow in the corresponding coil-side.

With supply restricted to a 3-phase supply, equal incremental phase-displacement between consecutive slots, equivalent to FIG. 1, Row (b), is not readily attainable.

However, such windings can be employed as secondary windings, when the number of phases is not restricted to the number of supply phases. The alternative pole-numbers are directly related to the number of phases. For example, a 6-pole/10-pole winding requires alternative 3-phase and 5-phase supplies, and so on.

THREE-STEP PHASE-MODULATION

Accepting the limitation to a constant number of supply phases, an alternative phase-modulation method is practicable and is used for windings according to the present invention. This method does not provide equal-incremental phase-displacements between coil-sides in consecutive slots but provides the same overall phase-displacement and provides this in a number of incremental steps related to the number of supply phases. For a 3-phase supply, the overall phase-displacement is provided in three steps.

Figure 4:
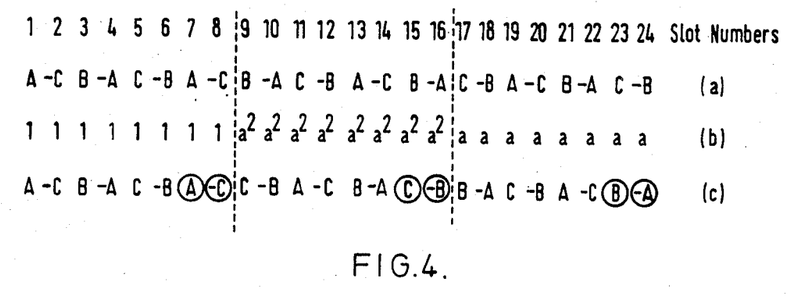
FIG. 4 is a table showing the winding distributions and phase-modulating pattern for an 8-pole/10-pole, 3-phase winding in 24 slots.

FIG. 4 is a table showing winding distributions for an 8-pole/10-pole, 3-phase winding in 24 slots.

FIG. 4, Row (a) shows the initial 8-pole winding distribution. The total phase displacement is $8\pi$ electrical radians, so that the displacement between consecutive slots is $8\pi/24$ electrical radians. The phase-modulation for 2-poles, corresponding to $2\pi$ electrical radians would, for equal-incremental displacements, correspond to $2\pi/24$ electrical radians per slot, but here is provided by three incremental steps each of $2\pi/3$ electrical radians.

As will be appreciated, the phase displacement of $2\pi/3$ radians corresponds to the phase displacement between the phases of a 3-phase supply. Hence, the required displacement can be obtained by switching the winding sections appropriately between phases.

FIG. 4, Row (b) shows the redistribution of the winding between phases, where the symbol "1" corresponds to no change in phase connection. The symbol "$a^2$" corresponds to a phase-modulation of $2\pi/3$ (lagging) radians provided by change of phase A to B, B to C or C to A. The symbol "a" corresponds to a phase-modulation of $4\pi/3$ (lagging) radians, or $2\pi/3$ (leading) radians, provided by change of phase A to C, B to A or C to B.

FIG. 4, Row (c), shows the modulated winding layout providing 10-poles. To facilitate 6-lead switching, it will be seen later that the coil-sides in circles may be omitted from circuit for either 8-pole or 10-pole operation.

Figure 5:
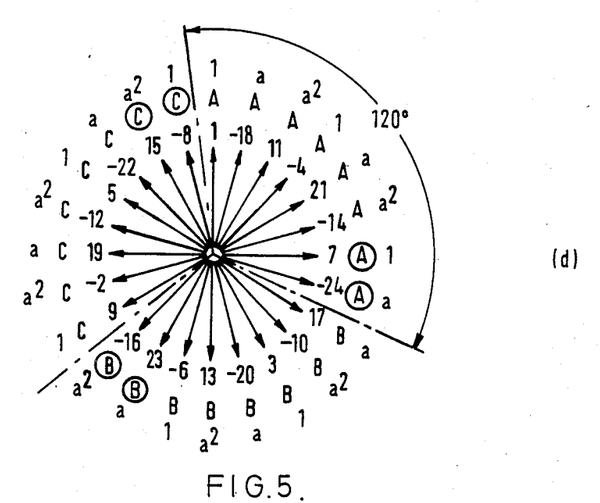
FIG. 5 is the slot-star diagram for the winding of FIG. 4, showing the vectors for the coil-sides with respect to 10 poles.

FIG. 5 is the slot-star diagram for the winding, showing the electrical space position of the respective coil-sides with respect to 10-poles. The 3-step form of modulation will be seen to result in 120 degrees spread of each phase-winding. This compares with zero spread, unity layer factor, for the ideal equal incremental phase-modulation, such as was shown in FIG. 1. The layer factor for the winding of FIG. 5 is nevertheless high at 0.827.

In FIG. 5, the 10-pole slot-star diagram, the symbols 1, $a^2$ and a, indicating the phase-modulation relatively to the 8-pole phase distribution, and the omitted coil-sides, all correspond to those shown in FIG. 4.

With reference to the 3-phase winding of FIGS. 4 and 5, it will be readily understood that each of the coil-sides, in the 24 slots, may be replaced by a coil-group, thereby extending the winding layout to a corresponding multiple of 24 slots.

Similarly, the 3-phase winding of FIGS. 4 and 5 may form one component of a composite winding. This, also, would extend the composite 3-phase winding layout to a corresponding multiple of 24 slots.

SELF-PARALLELING PHASE-WINDING CONNECTIONS

Figure 6:
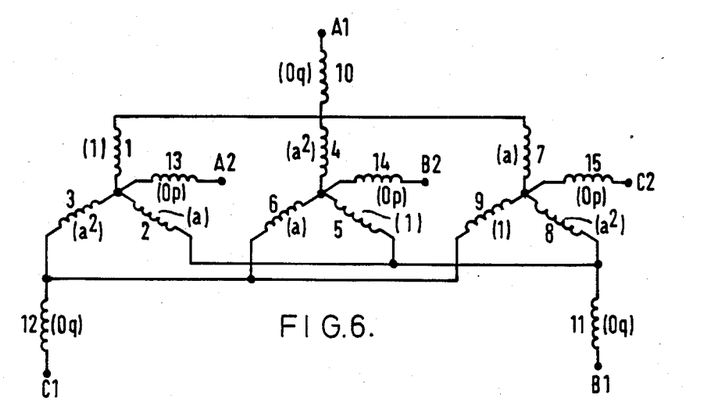
FIG. 6 is a circuit diagram showing alternative supply connections to a 3-parallel, star-connected, 3-phase arrangement with serially-connected branches omitted in one or other supply connection.

FIG. 6 shows a manner of connecting a composite 3-phase winding to a 3-phase supply in alternative, 3-parallel, star-connected modes, with part of the winding coils omitted in each connection mode.

The 3-phase winding of FIG. 6 comprises a first component winding of phase windings 1, 2 and 3 in star-connection. A second star-connected component winding 4, 5 and 6 and a third star-connected component winding 7, 8 and 9 are connected in parallel with the first. Series-connected winding parts 10, 11 and 12 are connected between the paralleled star connections and supply terminals A1, B1 and C1, respectively. Series-connected winding parts 13, 14 and 15 are connected between the three star-points and alternative supply terminals A2, B2 and C2, respectively.

For the first supply mode, the supply phases A, B and C are connected to terminals A1, B1 and C1. Terminals A2, B2 and C2 are isolated. Winding parts 1–3, 4–6 and 7–9 are all energised, winding parts 10, 11 and 12 being included in circuit and winding parts 13, 14 and 15 being omitted from circuit.

Figure 7:
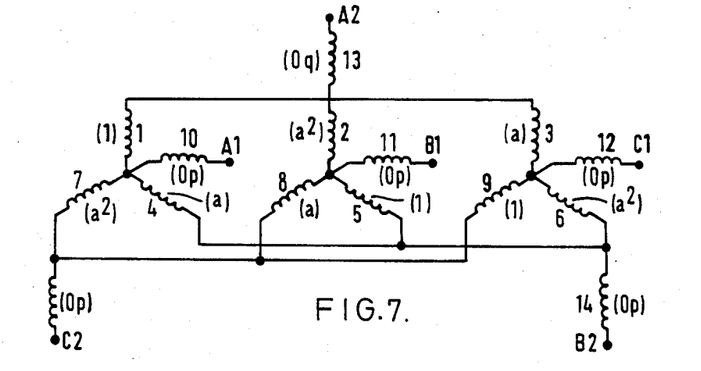
FIG. 7 is a circuit diagram, corresponding to that of FIG. 6, but showing the alternative supply connections.

FIG. 7 is the circuit diagram which corresponds to FIG. 6, but shows the alternative connection mode. The supply phases A, B and C are connected to the terminals A2, B2 and C2. Terminals A1, B1 and C1 are isolated. Winding parts 1, 4, 7; 2, 5, 8 and 3, 6, 9 are energised. Winding parts 13, 14 and 15 are now included in circuit and winding parts 10, 11 and 12 are omitted.

In both FIG. 6 and FIG. 7, symbols (1), ($a^2$) and (a), in brackets, are shown adjacent the phase-windings in 3-parallel connections. These symbols denote the phase changes involved by reconnection to the alternative connection mode. The symbol (1) denotes no change of phase, the symbol ($a^2$) denotes a change A to B, B to C or C to A and the symbol (a) denotes a change A to C, B to A or C to B. It will be noted that these symbols represent the same phase changes as in the earlier section of the specification dealing with phase-modulation.

In addition the winding parts 10, 11 and 12 are indicated by a symbol (Oq), in brackets, denoting that these coils are omitted in the FIG. 7 connection mode (q). The winding parts 13, 14 and 15 are indicated by a symbol (Op), in brackets, denoting that these coils are omitted in the FIG. 6 connection mode (p).

Figure 8:
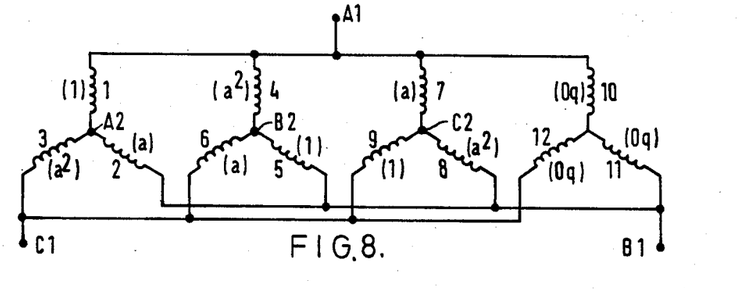
FIG. 8 is a circuit diagram showing alternative supply connections to a 4-parallel, star-connected, 3-phase arrangement.

FIG. 8 shows a different manner of phase-changing from that of FIGS. 6 and 7 in that the phase winding part omitted in the second or (q) connection mode, 10, 11 and 12, are connected together in star-connection as a fourth parallel 3-phase arrangement. The alternative connections to the other winding parts 1–3, 4–6 and 7–9 remain unchanged from FIGS. 6–7 and the change of phases in the alternative connections is also unchanged therefore. These are again denoted by the symbols (1), ($a^2$) and (a). The coils omitted in the second connection mode are indicated by the symbol (Oq), in brackets.

For the first (p) supply mode, the supply phases A, B and C are connected to terminals A1, B1 and C1. Terminals A2, B2 and C2 are isolated. For the second (q) supply mode, the supply phases A, B and C are connected to terminals A2, B2 and C2. Terminals A1, B1 and C1 are isolated.

Thus, it will be seen that the circuits of FIGS. 6 and 7 and of FIG. 8 both provide two modes for energising a 3-phase winding all the winding parts of which are permanently connected together, so that nine of the winding parts are self-paralleling to form a 3-parallel, star-connected arrangement in each of the two energising modes. The alternative energising modes are provided by 6-terminal changeover switching, and, in changing from the one mode to the other, six out of the nine winding parts are automatically switched between supply phases. Further, the circuit of FIGS. 6 and 7 provides for additional winding parts to be switched into circuit for either one of the two modes and omitted from circuit at the other. Since either one of the groups of additional winding parts, 10, 11 and 12 or 13, 14 and 15 may be omitted entirely, the residual group may be energised in either one of the energising modes, according to which set of terminals the group is permanently connected to.

The FIG. 8 circuit, however, provides for the omission of winding parts in one only of the two energising modes.

The FIGS. 6 and 7 and the FIG. 8 circuits differ in a further respect. The series-connected winding parts 10, 11, 12 and 13, 14, 15 of FIGS. 6 and 7, when connected into circuit, each carry three times the current of the 3-parallel connected winding parts. Hence, to have the same overall coil dimensions as the 3-parallel connected winding parts, the series-connected parts must have three-times the conductor cross-section and one-third the number of turns.

In the FIG. 8 circuit, where the winding parts 10, 11, 12 form a fourth, parallel-connected star arrangement, the conductor size and turns number is the same throughout the winding.

The 3-phase, pole-changeable windings to which the present invention relates always provide for the change of pole-number by 3-step phase-modulation effected by switching winding parts between phases, as was described with reference to FIG. 4, and further employ self-paralleling, 3-parallel, star-connected winding parts with 6-terminal, changeover switching as the means for switching winding parts between phases, as required for the said phase-modulation, and also for omitting from circuit a winding part in each phasewinding, in either energising mode, insofar as such is required by any particular winding design, as described with reference to FIGS. 6-8.

However, the phase-modulation method and the 3-parallel switching method cannot be combined arbitrarily. The fact that a 3-phase winding may have twelve or fifteen winding parts does not, in itself, render the winding suited to switching by the circuits of FIGS. 6–7 or FIG. 8. In particular the 3-phase winding of FIG. 4 is not suited to 3-parallel switching.

A 3-parallel circuit can be employed only if the resultants of each of the combinations of vectors for the winding parts referenced (1), (a²) and (a) of each phase are equal and cophasal, or are nearly so.

This is not the case for the 8-pole/10-pole example of FIG. 4, particularly since the number of coil sides per phase is not a multiple of "three". Even if two coil-sides per phase are omitted at 10-poles, those coil-sides circled in FIG. 4, Row (c), the remaining six coils per phase cannot be paralleled at 10-poles without producing large circulating currents.

The design procedure by which the 8-pole/10-pole winding of FIG. 4 may be adapted to provide 3-parallel switching, with appropriate coil omission at 10-poles, will be described in the example which next follows.

DESCRIPTION OF THE EXAMPLES

The first example to be described is a 3-phase, pole-changeable, 8-pole/10-pole, phase-modulated winding in 72 slots, using 6-terminal changeover switching of self-paralleled winding parts.

Figure 9:
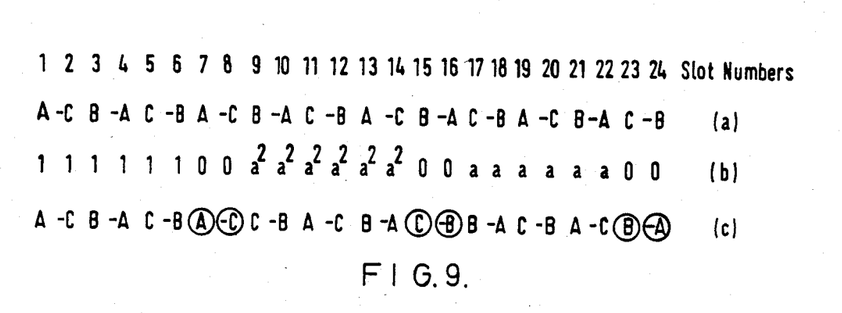
FIG. 9 relates to one example of the invention and reproduces the 24-slot winding of FIG. 4, as a component winding.

FIG. 9 reproduces the 3-phase winding of FIG. 4, the top row indicating slot numbers, Row (a) showing the 8-pole winding distribution, Row (b) the 3-step phase modulation applied and Row (c) the 10-pole winding distribution and omitted coil-sides.

Figure 10:
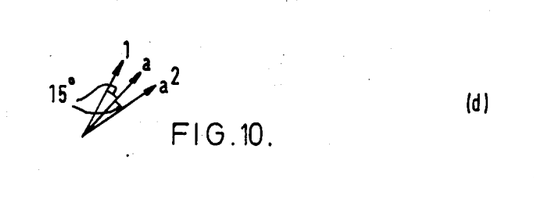
FIG. 10 is a phase vector diagram of the FIG. 9 winding in relation to 10 poles.

The three pairs of coil-sides per phase, shown as 1, a and a², which are left in circuit at 10-poles have resultants which are equal in magnitude but spaced apart by 15 electrical degrees. FIG. 10 is a phase vector diagram for the residual coil-sides of Phase A.

The self-paralleling method according to the invention uses the 3-phase winding of FIG. 9 as one of three identical component windings, occupying 24 slots. The second and third components each occupy 24 slots, making 72 slots in total. The three 3-phase component windings provide the winding parts for 3-parallel, 3-phase connections as shown in FIGS. 6 and 7 and FIG. 8. Furthermore, this self-paralleling method provides three identical component windings which are theoretically combined at 120 electrical degrees displacement at the unmodulated pole-number, of 8-poles, and which are combined at zero electrical degrees displacement at the modulated pole-number, of 10-poles. In practice, this means that those coilsides which are energised at the unmodulated polenumber are combined at substantially 120 electrical degrees displacement and those coil-sides which are energised at the modulated pole-number are combined at substantially zero electrical degrees displacement.

In this example, all 72 coil-sides are combined at approximately 120 electrical degrees displacement in the 8-pole connection and 54 of the 72 coil-sides are combined at approximately zero electrical degrees displacement in the 10-pole connection, the remaining 18 coil sides being omitted.

Figure 11:
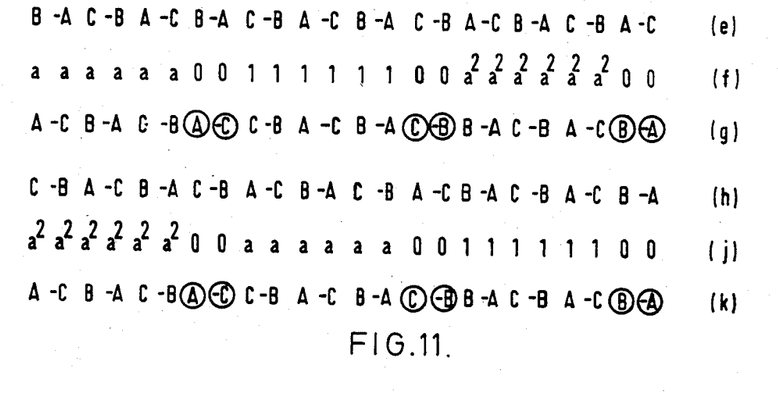
FIG. 11 shows second and third component windings to be combined with the winding of FIG. 9.

Accordingly, FIG. 11, which is drawn in relation to FIG. 9 for comparison therewith, shows the second and third winding components each in 24 slots. FIG. 11, Row (e), shows the 8-pole winding distribution of the second component. Row (f) shows the 3-step phase-modulation of the second component and Row (g) shows the 10-pole winding distribution and omitted coil-sides of the second component. FIG. 11, Row (h) shows the 8-pole winding distribution of the third component, Row (j) shows the 3-step phase-modulation of the third component and Row (k) shows the 10-pole winding distribution and omitted coil-sides of the third component.

Figure 12:
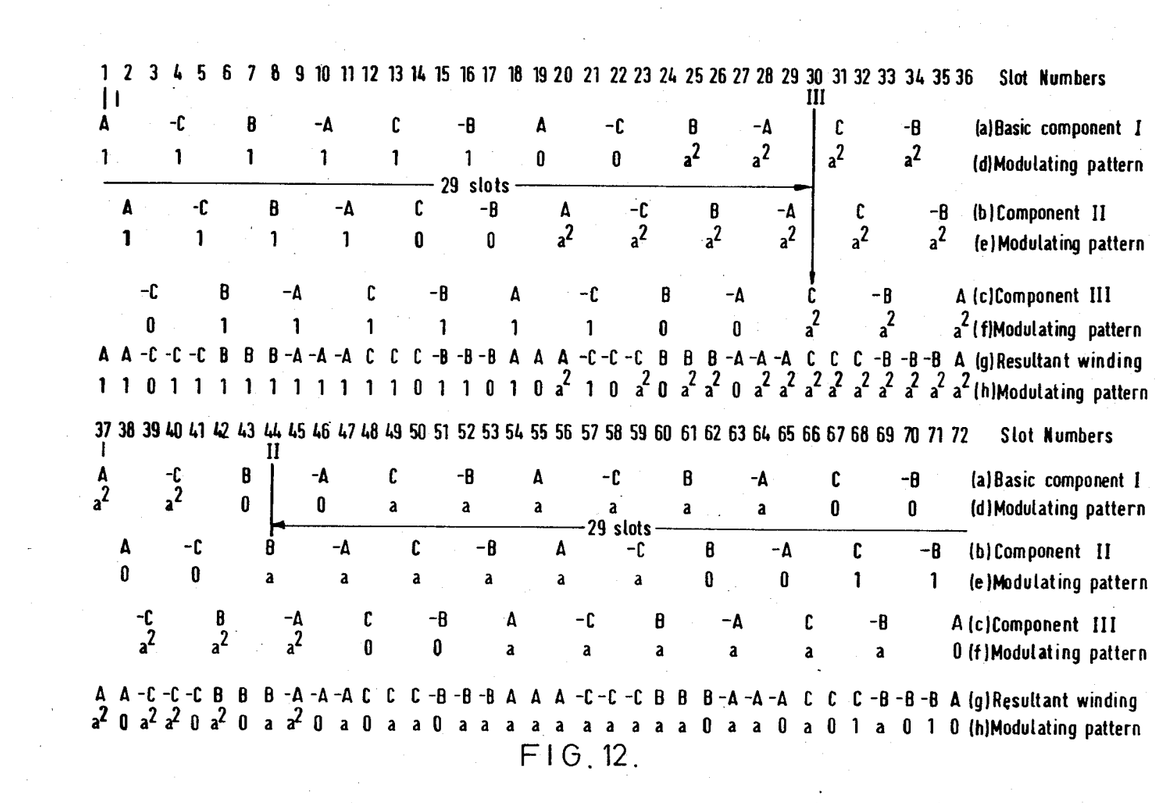
FIG. 12 is a slot winding diagram of the 72-slot winding resulting from combination of the three component windings of FIGS. 9 and 11.

FIG. 12 is a slot winding diagram of the resultant 8-pole/10-pole winding in 72 slots comprising the three 24-slot components of FIGS. 9 and 11. Slots 1–36 are shown above in the diagram and slots 37–72 are shown below, for convenience.

FIG. 12, Row (a) shows the first 24-slot winding component of FIG. 9 placed in every third slot of a 72-slot stator. According to the self-paralleling method of the invention, the second and third winding components should be inserted in the remaining 48 slots at zero displacement at 10 poles and at 120 electrical degrees spacing at 8 poles. This theoretical requirement cannot be exactly met in this practical example. The approximate spacings are determined in the following manner.

The second component winding is displaced 29 slots to the left with respect to the first component start in slot 1, without change of phase at 10 poles, but reassigning phases A to B, B to C and C to A, with respect to 8 poles.

The third component winding is displaced 29 slots to the right with respect to slot 1, without change of phase at 10 poles, but reassigning phases A to C, B to A and C to B, with respect to 8 poles.

In the resultant 72-slot winding, zero electrical displacement at the modulated pole-number of 10 poles occurs at a slot-number interval of $(72 \div 10)k$ slots, where "k" is a positive integer, that is 7.2k slots. The slot spacing (7.2×4) gives a theoretical value of "28.8" and a close approximate practical spacing of 29 slots.

This practical 29-slot spacing gives −5 and +5 electrical degrees error from the theoretical zero displacement at 10 poles and gives +20 and −20 electrical degrees error from the theoretical 120 electrical degrees displacement at 8 poles. This 20 degrees error at 8 poles is not serious, because the component windings can already be paralleled at the unmodulated pole-number. The error merely causes the original layer factor to be multiplied by the value (1+2 cos 20°)/3, that is 0.960.

FIG. 12 shows this spacing from slot 1 to slot 30 and from slot 44 to slot 1. FIG. 12, Row (b) shows the layout of the second winding component and Row (c) shows the layout of the third winding component. Row (d) shows the first winding component phase-modulating pattern, Row (e) shows the second component modulating pattern and Row (f) shows the third component modulating pattern.

FIG. 12, Row (g) shows the resultant winding layout in 72 slots and Row (h) shows the overall 3-step phase-modulating pattern.

Figure 13:
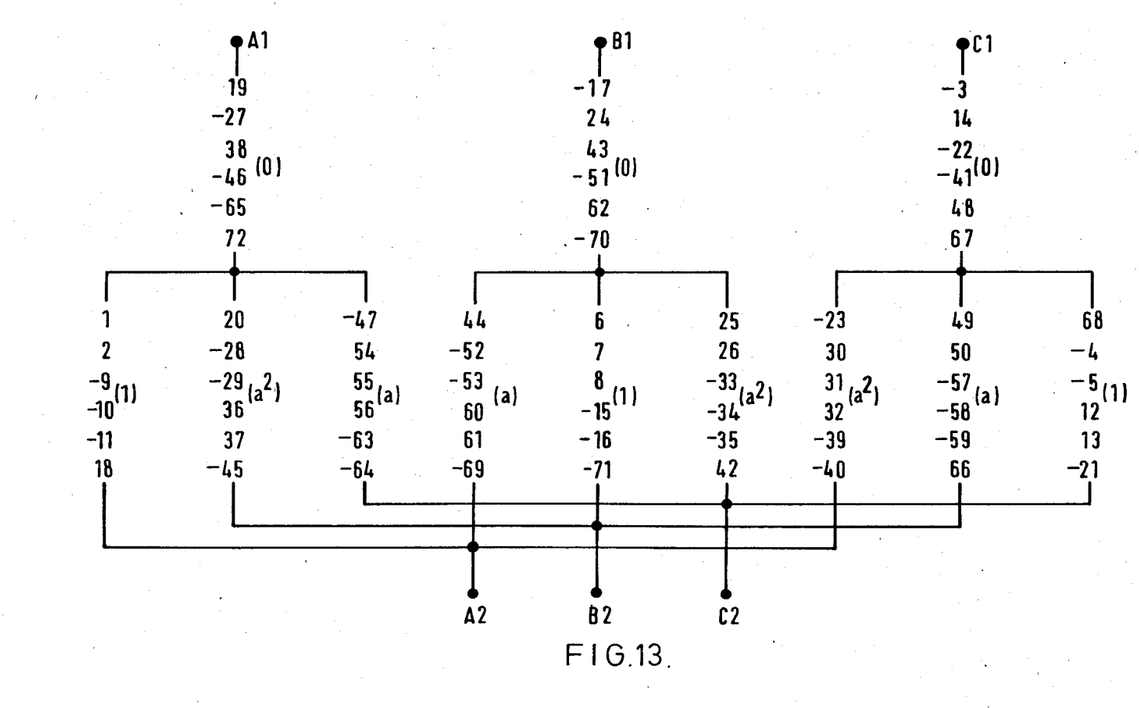
FIG. 13 is a circuit diagram showing the alternative supply connections for the winding of FIG. 12, with coils omitted in the modulated supply connection.

FIG. 13, which is to be compared with the alternative arrangements of FIGS. 6 and 7, is a circuit diagram showing the winding part connections of the 3-phase winding of FIG. 12, to provide 3-parallel connections with series-connected winding parts at 8 poles omitted at 10 poles. There are no winding parts to be omitted in the 8-pole connection. In FIG. 13, the coil-sides of the various winding parts are represented by the number of the stator slot in which they are wound.

For the 8-pole connection, supply phases A, B and C are connected to terminals A1, B1 and C1. Terminals A2, B2 and C2 are isolated. For the 10-pole connection, terminals A2, B2 and C2 are supplied and terminals A1, B1 and C1 are isolated.

Regarding the use of a supply circuit according to FIG. 8, further criteria need to be satisfied. In order to use the 4-parallel, star-connected supply circuit, the e.m.f.'s in all four branches need to be approximately equal in both magnitude and phase, when energised. When the fourth group of coils is omitted from circuit, they must either form a zero-sequence set, or must be zero in magnitude, or near to zero in magnitude.

Figure 14:
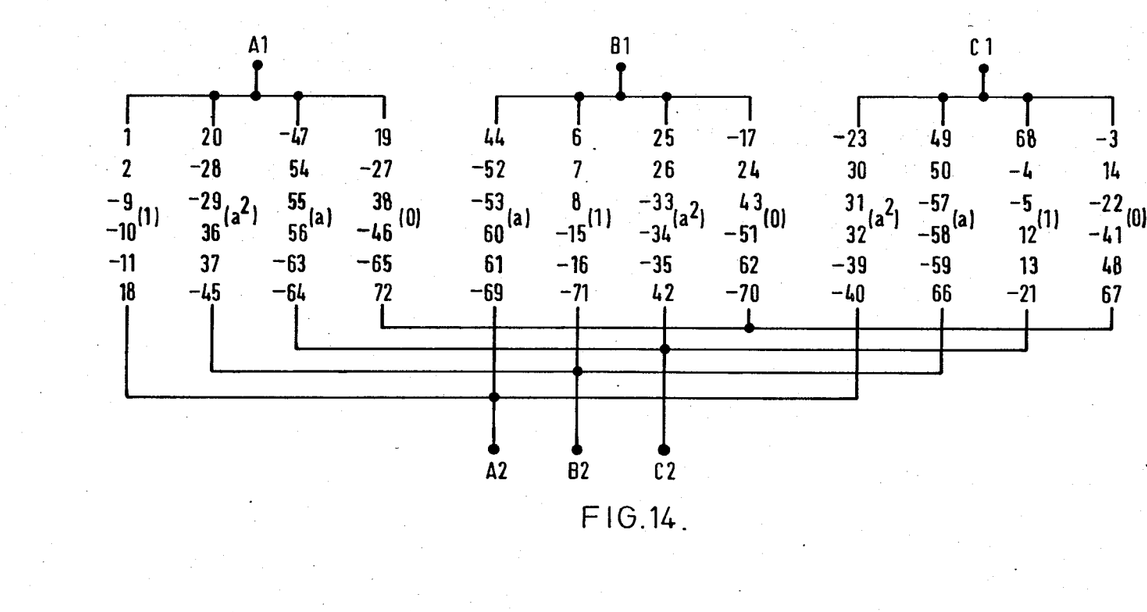
FIG. 14 is a circuit diagram showing the alternative supply connections when the winding of FIG. 12 is arranged as a 4-parallel, star-connected arrangement.

FIG. 14, which is to be compared with FIG. 8, provides supply connections for the winding of FIG. 12 which satisfy these further criteria. For the 8-pole connection, supply phases A, B and C are connected to terminals A1, B1 and C1. Terminals A2, B2 and C2 are isolated. For the 10-pole connection, terminals A2, B2 and C2 are supplied and terminals A1, B1 and C1 are isolated. The winding parts which make up a fourth, parallel-connected group at 8-poles, and which are referenced (O) in the diagram, are omitted from circuit in the 10-pole connection.

Figure 15:
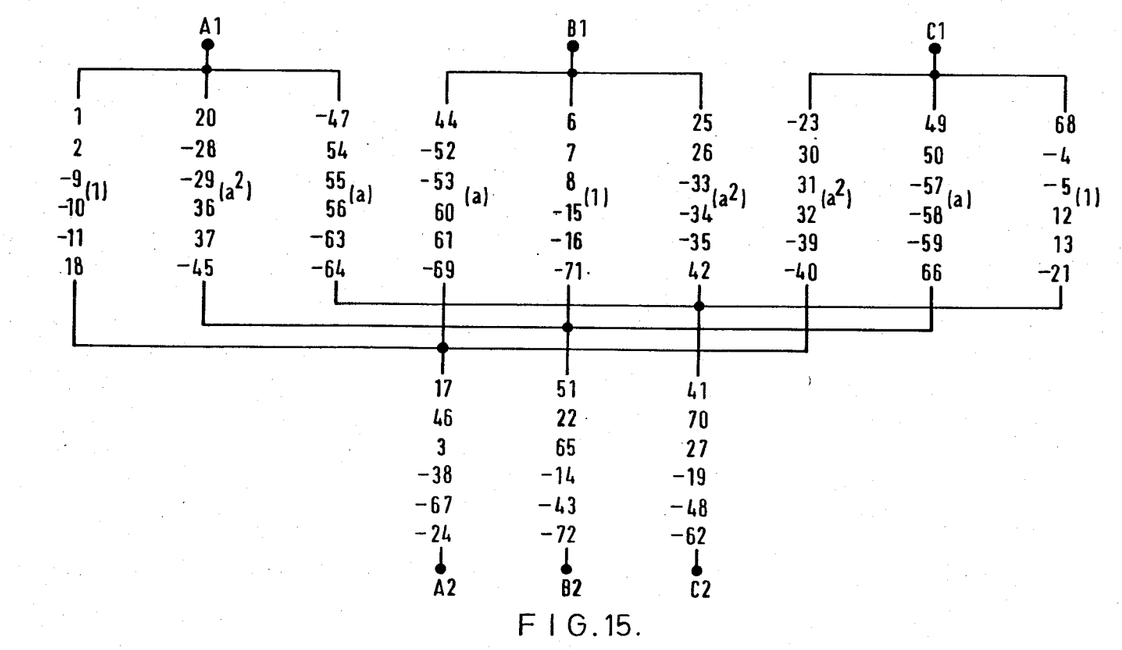
FIG. 15 is a circuit diagram showing the alternative supply connections when the winding of FIG. 12 is modified so that coils are omitted in the unmodulated supply connection, instead of in the modulated supply connection as in FIG. 13.

FIG. 15, which is also to be compared with FIGS. 6 and 7, shows a supply circuit arrangement in which coils are omitted in the unmodulated, 8-pole, connection but not in the modulated, 10-pole, connection. The nine winding parts which make up the 3-parallel, star-connected arrangement remains as in FIG. 13. However, the omitted coil-sides are rearranged between the phases.

For the 8-pole connection, supply phases A, B and C are connected to terminals A1, B1 and C1. Terminals A2, B2 and C2 are isolated and the coil-sides connected serially to those terminals are omitted from circuit. For the 10-pole connection, terminals A2, B2 and C2 are supplied and terminals A1, B1 and C1 are isolated. All the winding parts are then energised.

The second example to be described is a 3-phase, pole-changeable, 6-pole/4-pole, phase-modulated winding in 54 slots, using 6-terminal changeover switching of 3-parallel star-connected winding parts.

Figure 16:
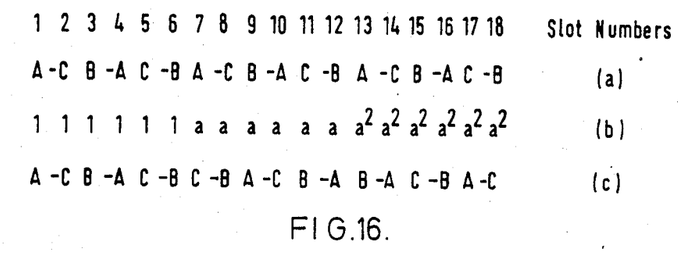
FIG. 16 is a slot diagram showing the layout of a 3-phase, 6-pole/4-pole component winding in 18 slots.

FIG. 16 is a slot diagram showing the layout of a 3-phase, 6-pole/4-pole component winding in 18 slots. FIG. 16, Row (a) shows the unmodulated, 6-pole, winding distribution. Row (b) shows the 3-step phase-modulation pattern and Row (c) shows the modulated, 4-pole, winding distribution.

Figure 17:
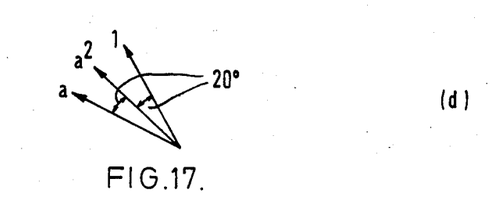
FIG. 17 is a vector diagram of the three Phase A vectors of the component winding of FIG. 16 with respect to 4 poles.

FIG. 17 shows the three vectors (1), (a) and ($a^2$) for phase a. These are equal in magnitude and displaced in phase by 20 electrical degrees.

Figure 18:
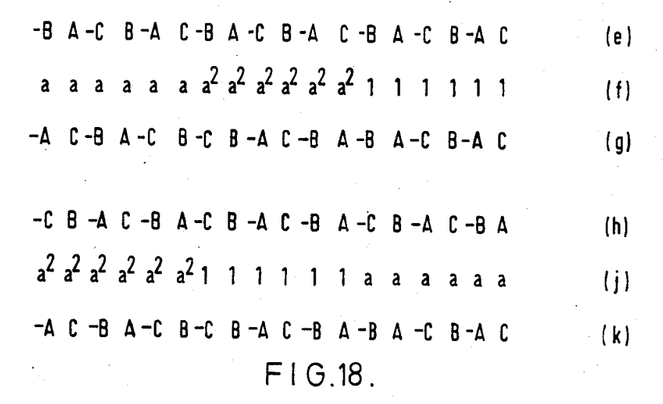
FIG. 18 is a slot diagram showing the layout of second and third component windings to be combined with the component winding of FIG. 16.

FIG. 18, which is drawn in relation to FIG. 16 for comparison therewith, shows the second and third winding components each in 18 slots. FIG. 18, Row (e) shows the 6-pole winding distribution of the second component. Row (f) shows the 3-step phase modulation of the second component and Row (g) shows the 4-pole winding distribution of the second component. FIG. 18, Row (h) shows the 6-pole winding distribution of the third component. Row (j) shows the 3-step phase modulation of the third component and Row (k) shows the 4-pole winding distribution of the third component.

FIG. 19 is a slot winding diagram of the resultant 6-pole/4-pole winding in 54 slots comprising the three 18D-slot components of FIGS. 16 and 18. Slots 1–27 are shown above in the diagram and slots 28–54 are shown below, for convenience.

FIG. 19, Row (a) shows the first 18-slot winding component of FIG. 16 placed in every third slot of a 54-slot stator. According to the self-paralleling method of the invention, the second and third winding components should be inserted in the remaining 36 slots at zero displacement at 4 poles and at 120 electrical degrees displacement at 6 poles. This theoretical requirement cannot be exactly met in this practical example. The approximate spacings are determined in the following manner.

The second component winding is displaced 14 slots to the right, with respect to the first component start in slot 1, without change of phase at 4 poles, but reassigning phases A to B, B to C and C to A, with respect to 6 poles.

The third component winding is displaced 14 slots to the left, with respect to slot 1, without change of phase at 4 poles, but reassigning phase A to C, B to A and C to B with respect to 6 poles.

In the resultant 54-slot winding, zero electrical displacement at the modulated pole-number of 4 poles occurs at a slot-number interval of $(54 \div 4)k$ slots, where "k" is a positive integer, that is 13.5k slots. Taking a value of k=1, gives a theoretical value of 13.5 slots, to which the practical spacing of 14 slots is a close approximation.

This practical 14-slot spacing gives −6.67 and +6.67 electrical degrees error from the theoretical zero displacement at 4 poles and gives +20 and −20 electrical degrees errors from the theoretical 120 electrical degrees displacement at 6 poles. Only the modulated pole-number, 4 pole, values are critical in determining the inequality of the e.m.f.'s of the parallel paths in the 4-pole connection, because equality already exists in the component winding with respect to 6 poles. The 20 degree error merely causes the original layer factor to be multiplied by the value (1+2 cos 20°)/3, that is 0.960.

FIG. 19 shows the spacing from slot 1 to slot 15 and from slot 41 to slot 1. FIG. 19, Row (b) shows the layout of the second winding component and Row (c) shows the layout of the third winding component. Row (d) shows the first winding component phase-modulating pattern, Row (e) shows the second component modulating pattern and Row (f) shows the third component modulating pattern.

FIG. 19, Row (g) shows the resultant winding layout in 54 slots and row (h) shows the overall 3-step phase-modulating pattern.

Figure 20:
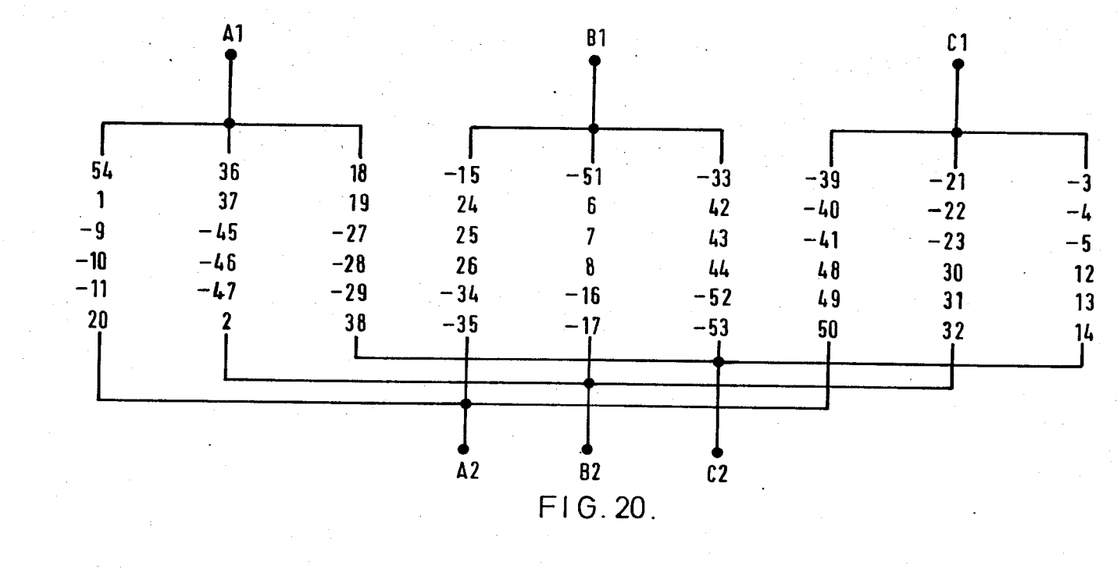
FIG. 20 is a circuit diagram showing the alternative supply connections for the winding of FIG. 19.

FIG. 20, which is to be compared with FIGS. 13, 14 and 15 for the 8-pole/10-pole winding example with coil omission, is a circuit diagram showing the winding part connections of the 3-phase winding of FIG. 19, to provide 3-parallel connections at 6 poles and at 4 poles, without coil omission either at the unmodulated pole-number, 6 poles, or at the modulated pole-number, 4 poles. In FIG. 20, the coil-sides of the various winding parts are represented by the number of the stator slot in which they are wound.

For the 6-pole connection, supply phases A, B and C are connected to terminals A1, B1 and C1. Terminals A2, B2 and C2 are isolated. For the 4-pole connection, terminals A2, B2 and C2 are supplied and terminals A1, B1 and C1 are isolated.

It will be appreciated that 3-phase, polechangeable, phase-modulated windings, which provide 3-parallel, star-connected arrangements and which provide 6-terminal changeover switching between the modulated and unmodulated pole-numbers, without requiring the omission of coils at either pole-number, of which the winding of FIGS. 19 and 20 is one example, form particularly valuable practical examples of the invention, because all winding parts are energised at both pole-numbers. The full utilisation of the winding at both pole-numbers can lead to a higher power rating at one or both speeds.

It is particularly to be noted that 3-phase, polechangeable, phase-modulated windings of this class, which do not require coil-omission at either pole-number, are identified, firstly, by component windings having a multiple of 9 coils, that is a factor of 3 coils, corresponding to the 3-phase supply, and a further factor of "3" corresponding to the 3 parallel paths per phase. Secondly, the method of self-paralleling according to the invention provides for 3 such component windings, in the stated physical and electrical displacements, to provide the required resultant winding. This involves a further factor of "3", so that the resultant winding must always be in a number of slots which is a multiple of "27".

I claim:

1. A 3-phase, pole-changeable, phase-modulated winding switchable to provide an unmodulated pole-number and a modulated pole-number by alternative connection of a 3-phase supply to a first set of three supply terminals and to a second set of three supply terminals, said 3-phase winding providing a 3-parallel, 3-phase, star-connected arrangement of winding branches with both said alternative supply connections together with winding branches serially-connected to at least one set of said first and second sets of three supply terminals, said 3-phase winding comprising three identical component windings, each component winding providing winding parts in each of said 3-parallel, 3-phase, star-connected arrangement of winding branches and in each of said serially-connected winding branches, said three identical component windings being physically spaced apart within said 3-phase winding such that the electrical displacement therebetween at said unmodulated pole-number is substantially 120 degrees and the electrical displacement at said modulated pole-number is substantially zero and said winding parts of said component windings being distributed between the phases of said 3-phase winding such that said alternative supply connections provide 3-step phase-modulation, of said 3-phase winding.

2. A 3-phase, pole-changeable, phase-modulated winding switchable to provide an unmodulated pole-number and a modulated pole-number by alternative connection of a 3-phase supply to a first set of three supply terminals and to a second set of three supply terminals, said 3-phase winding providing solely a 3-parallel, 3-phase, star-connected arrangement of winding branches with both said alternative supply connections, said 3-phase winding comprising three identical component windings each component winding providing winding parts in each of said 3-parallel, 3-phase, star-connected arrangement of winding branches, said three identical component windings being physically spaced apart within said 3-phase winding such that electrical displacement therebetween at said unmodulated pole-number is substantially 120 degrees and the electrical displacement at said modulated pole-number is substantially zero and said winding parts of said component windings being distributed between the phases of said 3-phase winding such that said alternative supply connections provide 3-step phase-modulation, of said 3-phase winding.

3. A 3-phase, pole-changeable, phase-modulated winding as claimed in claim 1, comprising three winding components each occupying 24 slots of a 72-slot stator, being spaced apart therein by 29 slots and providing alternative pole-numbers of 8-poles and 10-poles.

4. A 3-phase, pole-changeable, phase-modulated winding as claimed in claim 3, in which said winding comprises a 4-parallel, 3-phase, star-connected winding arrangement, providing 3-parallel connections with series-connected winding parts at 8-poles and 3-parallel connections with three winding parts omitted from circuit at 10-poles.

5. A 3-phase, pole-changeable, phase-modulated winding as claimed in claim 2, comprising three winding components each occupying 18 slots of a 54 slot stator, being spaced apart therein by 14 slots and providing alternative pole-numbers of 6-poles and 4-poles.

6. A 3-phase, pole-changeable, phase-modulated winding as claimed in claim 5, comprising a 3-parallel, 3-phase, star-connected winding arrangement, providing 3-parallel connections at 6-poles and 3-parallel connections at 4-poles, all winding parts of said winding being energised at each said alternative pole-number.

* * * * *